United States Patent
Simske et al.

(10) Patent No.: US 8,798,328 B2
(45) Date of Patent: Aug. 5, 2014

(54) FORENSIC MARKING IDENTIFYING OBJECTS

(75) Inventors: Steven J. Simske, Fort Collins, CO (US); Marie Vans, Ft. Collins, CO (US); Stephen Pollard, Dursley (GB); Guy Adams, Stroud (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 635 days.

(21) Appl. No.: 13/087,542

(22) Filed: Apr. 15, 2011

(65) Prior Publication Data

US 2012/0263343 A1   Oct. 18, 2012

(51) Int. Cl.
*G06K 9/00* (2006.01)
*H04N 1/44* (2006.01)

(52) U.S. Cl.
USPC ........... 382/112; 382/100; 382/181; 382/190; 382/199

(58) Field of Classification Search
CPC ............ G06K 9/00442; G06K 9/2054; G06K 9/2063; G06T 2201/0601; G06T 7/403; H04N 1/00761; H04N 1/00769; H04N 1/00771; H04N 1/00846; H04N 1/00848
USPC ............................ 382/112, 100, 181, 190, 199
See application file for complete search history.

(56) References Cited

U.S. PATENT DOCUMENTS

| | | | |
|---|---|---|---|
| 6,819,775 B2* | 11/2004 | Amidror et al. | 382/100 |
| 7,002,710 B1* | 2/2006 | Van Liew et al. | 358/3.28 |
| 2005/0132194 A1* | 6/2005 | Ward | 713/176 |
| 2006/0028689 A1* | 2/2006 | Perry et al. | 358/3.28 |
| 2010/0067691 A1* | 3/2010 | Lin et al. | 380/55 |
| 2011/0096368 A1* | 4/2011 | Maher et al. | 358/3.28 |
| 2011/0298203 A1* | 12/2011 | Pan et al. | 283/67 |
| 2012/0051601 A1* | 3/2012 | Simske et al. | 382/112 |
| 2012/0212324 A1* | 8/2012 | Pollard et al. | 340/5.86 |

OTHER PUBLICATIONS

Simske, et al. "High-Resolution Glyph-Inspection Based Security System." LABS hp. (2010): 1-5. Print.*
Simske, et al. "Document Imaging Security and Forensics Ecosystem Considerations." ACM DocEng. (2010): 21-24. Print.*
Mikkilineni, et al. "Signature-Embedding in Printed Documents for Security and Forensic Applications." Proc. SPIE 5306, Security, Steganography, and Watermarking of Multimedia Contents. VI. (2004): 1-12. Print.*
Chiang, et al. "Extrinsic signature embedding in text document using exposure modulation for information hiding and secure printing in electrophotography." Proceedings of the IS&T's NIP21: International Conference on Digital Printing Technologies. (2005): 231-234. Print.*
Chiang, et al. "Extrinsic Signatures Embedding and Detection in Electrophotographic Halftone Images through Laser Intensity Modulation." Society for Imaging Science and Technology. (2006): 432-435. Print.*

* cited by examiner

*Primary Examiner* — Michael A Newman

(57) ABSTRACT

An image is obtained of an identifying object that is on a printed document. A forensic signature is extracted from the image. Access to the extracted forensic signature profile is enabled via information encoded in the identifying object. The identifying object may be interpreted to access the forensic signature for comparison with another.

19 Claims, 4 Drawing Sheets

FORENSIC MARKING IDENTIFYING OBJECTS

BACKGROUND

Documents exist, by necessity, in both physical and electronic form. During the lifecycle of a single document, in some workflows, the document may at times exist in its electronic form, and at other times in its physical form. For example, during the course of progression through a workflow, an electronic document file may be printed and a printed document may be scanned. Over the course of the workflow, these processes may be performed several times. Alternatively or in addition, a physical document may progress along several steps in a workflow during its lifecycle.

Various techniques have been developed for coding information to be accessed as the document progresses through the workflow. For example, a barcode may be affixed at each point that contains information related to the document, such as identifying information, instructions related to the document, and a destination. At various steps of the workflow, additional barcodes may be affixed. Various devices, including portable devices, have been developed that enable convenient scanning and printing of such barcodes.

Affixing an incremental identifying object (IIO) to the document is used to add incremental, state-related encoded information to the document within a predetermined area of the document. For example, an IIO may be in the form of a matrix pattern of elements, referred to as a progressive barcode. Each element of the progressive barcode may either be filled in (e.g. a black, gray, or colored ink) or left blank. At each step of the workflow, only a small subset of the elements may be used to encode further information. Thus, information may be added to the IIO using previously unused or incompletely exhausted (e.g. not completely "dark" or black) elements. Thus, the amount of information in the IIO may be progressively increased while the area of the document that is occupied by the IIO remains constant.

BRIEF DESCRIPTION OF THE DRAWINGS

Reference is made to the accompanying drawings, in which.

DETAILED DESCRIPTION

Figure 1:
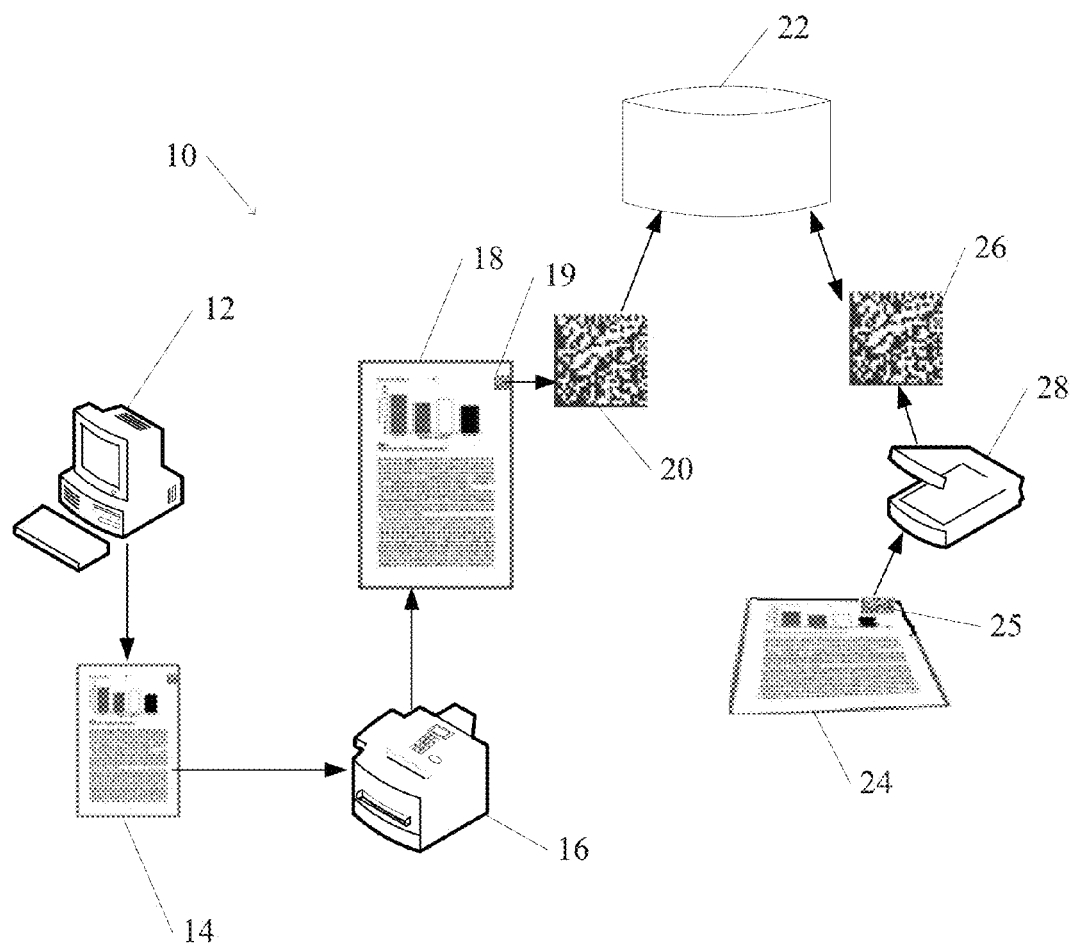
FIG. 1 schematically illustrates use forensic signature with an IIO, in accordance with an embodiment of the invention.

A forensic marking identifying object (either a fixed identifying object, such as a one or two-dimensional barcode, or an incremental identifying object, or IIO, such as a progressive barcode), in accordance with an embodiment of the invention, includes encoded information that enables access to a forensic signature.

In accordance with an embodiment of the invention, a copy of an electronic document is printed on a substrate (e.g. paper or cardstock) together with an identifying object, such as an IIO in the form of a progressive barcode. The identifying object is scanned with a high enough resolution so as to derive a forensic signature from the identifying object. Typically, the forensic signature is derived from an analysis of a scan of an edge of the identifying object. The forensic signature is based on random variations along an edge of (or internal to—e.g. holes or pores within) a printed mark that result from uncontrolled random aspects of the printing process (e.g. ink droplet formation and differential absorbance of ink into fibers of the substrate). Such variations, and thus the forensic signature, are typically noticeably different if the document is printed a second time.

The derived forensic signature is stored or encoded in a manner that is associated with the document. This may include encoding the forensic signature into an IIO itself. For example, an interior portion of a progressive barcode may be overprinted with elements that define the forensic signature. Alternatively, a second mark (not necessarily a progressive barcode—it could be a fixed identifying object such as a barcode, micro-text, or a color tile) that encodes the forensic signature may be appended or placed near to, or associated with, the IIO. For example, encoding the forensic signature in a second mark may include encrypting the forensic signature, XOR encryption, or otherwise hashing the forensic signature with another sequence. Alternatively, the encoded forensic signature may be electronically stored in a manner that is associated with the document and that is accessible via information that is encoded in the identifying object. For example, the forensic signature may be stored in an accessible repository at a location or address that is indicated by information encoded in the identifying object. Alternatively or in addition, information that is encoded in the identifying object (e.g. a password or access code, or a decryption key) may enable access to an electronically stored representation of the forensic signature. Alternatively, the forensic signature may be encoded into an IIO of an updated electronic version of the document that is itself accessible via information that is encoded in the identifying object.

A user who receives a printed document (or a high resolution scanned image, or electronic version, of a printed document) may utilize the identifying object and the forensic signature to authenticate the document. The identifying object may be scanned (at relatively low resolution) to identify the document and to extract encoded data related to the forensic signature. The extracted data may include an encoding of the forensic signature, or an encoding of a reference to an electronically stored forensic signature. A portion (e.g. an edge) of the identifying object may be scanned at a high enough resolution in order to extract a forensic signature from the scan data. The extracted forensic signature may then be compared with the encoded signature. If the extracted signature and the encoded signature are identical to within a predetermined degree, the document may be considered to be authenticated.

FIG. 1 schematically illustrates the use of a forensic signature with an IIO, in accordance with an embodiment of the invention. In accordance with an embodiment of the invention, document creation system 10 may generate a printed document 18 that includes an IIO, such as printed progressive barcode 19. (A progressive barcode is based on a two dimensional "barcode" that includes a two-dimensional arrangement of modules or tiles.)

User device 12 of document creation system 10 typically includes a processor, and one or more input/output devices that enable a user to interact with user device 12. User device 12 may communicate with one or more fixed or removable data storage devices. A data storage device of user device 12 may be capable of storing programmed instructions for enabling user device 12 to execute a method in accordance with an embodiment of the invention.

User device 12 may create an electronic version of a document, such as electronic document 14. Electronic document 14 and printed document 18 may be understood to represent a document, or a mailing label or other descriptive information to be attached to another object, such as a package, parcel, envelope, carton, or wrapper.

In accordance with an embodiment of the invention, a single authentic copy of printed document 18 is printed (e.g. printed document 18 is a high value single copy document). Any additional printed copies of electronic document 14, or any copy (such as a photocopy, or a scanned and printed copy) of printed document 18, may thus be considered an inauthentic or unauthorized copy, or a forgery. Alternatively, several authorized copies of electronic document 14 may be printed. In this case, each of the several authorized copies has its own forensic signature that is different from that of any of the other copies. Therefore, for the purpose of this description, each such one of several authorized copies may be considered to be a single copy.

User device 12 communicates with one or more devices that are capable of printing a document and scanning the printed document. Such a collection of devices may be represented by multi-functional peripheral (MFP) device 16. MFP device 16 may represent a separate printing device and scanning device arranged such that a document printed by the printing device is scanned by the scanning device.

User device 12 may send electronic document 14 to a printing function of MFP device 16 to generate printed document 18. Printed document 18 includes an IIO such as printed progressive barcode 19. Printed document 18, including printed progressive barcode 19, may be scanned by a scanning function of MFP device 16. Scanning of printed progressive barcode 19 of printed document 18 with a scanner of suitably high (e.g. on the order of a few microns) resolution results in scanned barcode image 20.

Scanned barcode image 20 may be analyzed, e.g. by a processor associated with user device 12, with MFP device 16, or with (a server associated with) registry 22, to extract a forensic signature. The forensic signature may be stored in registry 22. For example, registry 22 may represent a registry located on a data storage device associated with a server or shared directory that is accessible via a network or the Internet. Information for accessing the forensic signature in registry 22 may be encoded in printed progressive barcode 19. Registry 22 may, alternatively, include a copy of the image from which the signature can be recomputed. Alternatively or in addition, registry 22 may be understood as representing in a broader sense any storage of a representation of the forensic signature. Such a representation may include encoding a representation of the forensic signature in printed progressive barcode 19 itself, or in an associated mark that is printed on printed document 18.

At a later point, a received document 24 with received barcode 25, ostensibly identical with printed document 18, may be obtained. For example, received document 24 may be received by a user in a workflow associated with printed document 18. Prior to referring to the contents of received document 24, or forwarding received document 24 to another destination, it may be necessary to verify that received document 24 is indeed printed document 18.

Received barcode 25 of received document 24 may be scanned by a scanner 28. Scanner 28 may represent either a stationary device, or a portable (e.g. handheld or strap-on) scanning device. For example, scanner 28 may represent a device with processing capability that is designed to scan and analyze a progressive barcode.

Scanning received barcode 25 produces received barcode image 26. Received barcode image 26 may be analyzed at a relatively low resolution to obtain identifying information (e.g. tentatively identifying received document 24 with printed document 18), and an encoded forensic signature (e.g. by reading an encoded signature incorporated in received barcode image 26 or by reading information referring to a stored forensic signature in registry 22).

Received barcode image 26 may also be analyzed at a relatively high resolution, e.g. by a processor associated with scanner 28 or with registry 22, to obtain a forensic signature of received barcode 25. The obtained forensic signature may be compared with a forensic signature of printed document 18 that is retrieved from registry 22. If the obtained forensic signature is identical (within predetermined limits) to the forensic signature of printed document 18 that was retrieved from registry 22, received document 24 may be authenticated as being identical with printed document 18. (The criteria for determining whether two signatures are identical may be specific to the type of measurement, and may depend on such factors as similarity of the images or the computed sequences on which the signature computation is based.)

A typical IIO in the form of a progressive barcode includes a perimeter that includes registration marks and other non-payload indicia, and an interior region that includes encoded information in the form of payload indicia.

Figure 2:
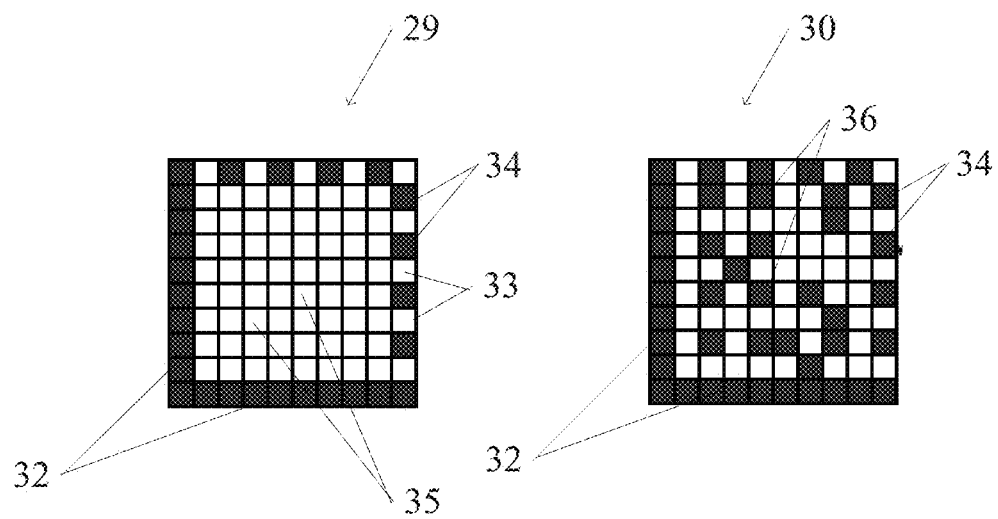
FIG. 2 shows an examples of an IIO for forensic marking of a document, in accordance with an embodiment of the invention.

FIG. 2 shows an example of an IIO for forensic marking of a document, in accordance with an embodiment of the invention. An empty progressive barcode 29 includes non-payload indicia only. The non-payload indicia may include, for example, predetermined patterns of blank or filled-in elements at a perimeter of empty progressive barcode 29. For example, non-payload indicia may include solid bars 32, as well as alternating colored or dark elements 34 interspersed with blank or light elements 33. Some of internal elements 35 may be filled with payload indicia.

Progressive barcode 30 includes payload indicia 36 in addition to the non-payload indicia. Payload indicia 36 may encode data. For example, each of internal elements 35 may represent a bit or other unit of data. Each of payload indicia 36 may indicate a value of a corresponding bit (when each internal element may be colored black or white). If payload indicia 36 are colored or patterned, each distinguishable color or pattern may represent a different value of a unit corresponding to each internal element 35.

Solid bars 32, dark elements 34, and light elements 33 may provide progressive barcode 30 with calibration and registration data. For example, solid bars 32, dark elements 34, and light elements 33 may enable a system that scans progressive barcode 30 to determine a position, size, and orientation of progressive barcode 30. In addition, solid bars 32, dark elements 34, and light elements 33 may aid in correcting or compensating for any distortion when progressive barcode 30 is scanned. Comparison of dark elements 34, and light elements 33 may enable calibrating a gray level or color scale for distinguishing payload indicia 36 from other internal elements 35 (and for determining a value where more than two values are possible).

Calibration, correction, and compensation may thus enable a scanning system that scans progressive barcode 30 to correctly associate payload indicia 36 with corresponding internal elements 35. Correct association of payload indicia 36 with internal elements 35 enables correct interpretation of data that is encoded by progressive barcode 30.

As a workflow progresses, more payload indicia 36 may be added to progressive barcode 30.

An edge (or other region) of a progressive barcode, such as progressive barcode 30, may be scanned at relatively high resolution (e.g. resolution on the order of a few microns, such as about 3 µm) in order to generate a forensic signature associated with progressive barcode 30.

Figure 3:
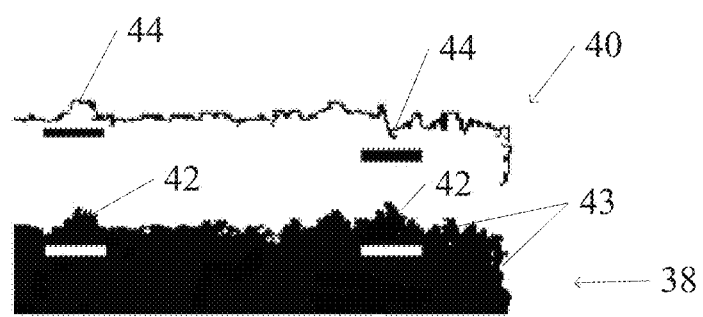
FIG. 3 illustrates extraction of a forensic signature from an image of an IIO, in accordance with an embodiment of the invention.

FIG. 3 illustrates extraction of a forensic signature from an image of an IIO, in accordance with an embodiment of the invention. Magnified section image 38 represents a magnified corner of an image of printed IIO, such as a progressive barcode. For example, magnified section image 38 may have been acquired using a scanning device of suitable resolution.

In magnified section image 38, external edges 43 are noticeably jagged. In particular, some regions of external edges 43, such as edge regions 42 (and indicated by solid bars below), may be characterized by exceptional variability. Such regions may be particularly suitable to serve as a basis for a forensic signature.

Magnified perimeter 40 represents a section of a perimeter of a magnified section of an image of a printed IIO, such as magnified section image 38. For example, magnified perimeter 40 may be acquired from a magnified section image 38 by application of a suitable edge detection filter or algorithm. In magnified perimeter 40, perimeter regions 44, being characterized by exceptional variability, may be particularly suitable to serve as a basis for a forensic signature.

Thus, a magnified perimeter 40 may be analyzed in order to extract a forensic signature associated with a printed document. When the document is first printed, the IIO of the document encodes information for accessing a representation of the signature, thus enabling verification of the authenticity of the document. When a document is received, the extracted forensic signature may be compared to the representation of the forensic signature that is accessible via the encoded information in the IIO so as to verify authenticity of the received document.

A method for extracting a forensic signature from an image of an IIO may include segmenting a perimeter of the IIO image, calculating edge variations in each segment, and encoding the edge variations.

Figure 4:
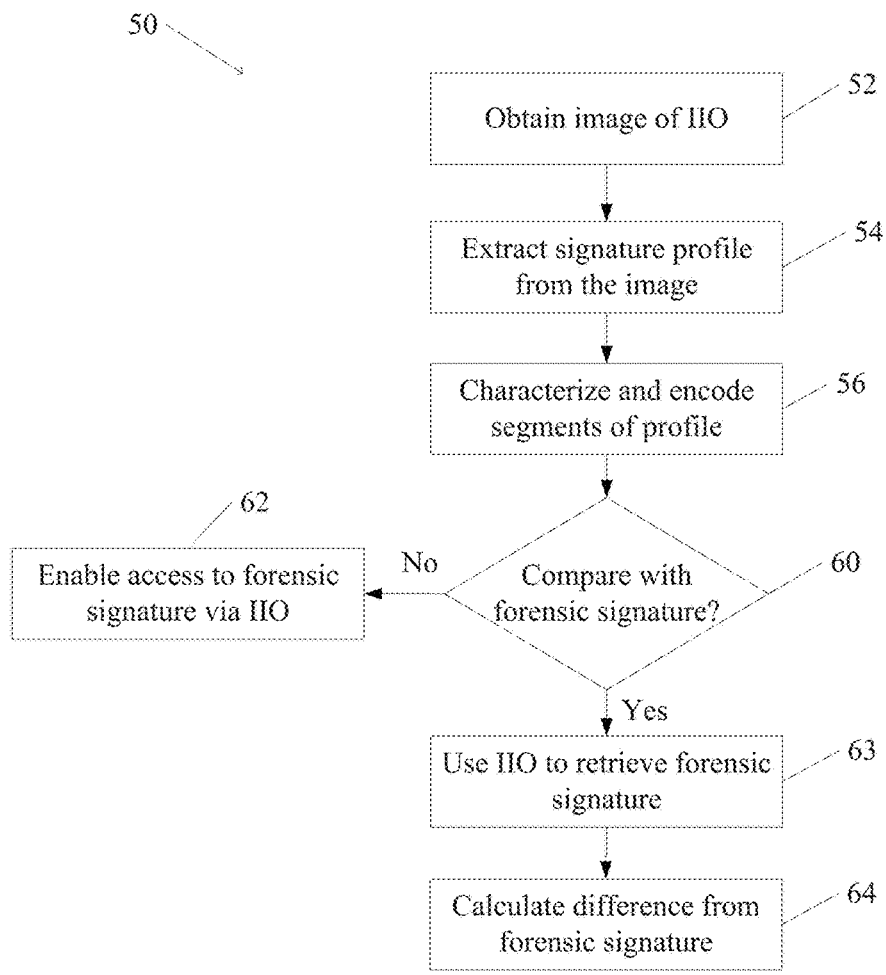
FIG. 4 is a flowchart of a method for extracting a forensic signature from an image of an IIO, in accordance with an embodiment of the invention.

FIG. 4 is a flowchart of a method for extracting a forensic signature from an image of an IIO, in accordance with an embodiment of the invention. It should be understood that division of the method into discrete steps as illustrated in the flowchart is for clarity and convenience only. Alternative division of the method into steps may be possible with equivalent results. All such alternative division into steps should be considered as included within the scope of embodiments of the invention. The order of steps shown in the flowchart, unless stated otherwise, is selected for clarity and convenience only. Steps of the flowchart may be executed in alternative order, or concurrently, with equivalent results. All such equivalent reordering of steps of the flowchart should be considered as included within the scope of embodiments of the invention.

Forensic signature extraction method 50 includes obtaining a scanned image of an IIO (step 52). The scanned image may be obtained by scanning a printed IIO on the document (or a previously scanned image may be retrieved from a suitable storage device). The scanned image is scanned at sufficient resolution so as to enable detection of random or uncontrolled variations in the perimeter of the IIO (and may include a section such as magnified section image 38 in FIG. 3).

The scanned image may be processed so as to extract a forensic signature profile from the image (step 54). For example, processing may include identifying a perimeter of the IIO in the image (such as magnified perimeter 40 in FIG. 3). Analysis may further identify random components (the forensic signature profile) of the perimeter and isolate them from an overall outline of the perimeter. For example, a model-based approach may be applied. In a model-based approach, a model of the IIO may have been constructed by analysis of previously printed and scanned samples of the IIO (or from a priori knowledge of the printed patterns).

In applying the model-based approach, the model is fitted to a stable non-random shape that conveys features of the IIO. The random features which make up the forensic signature profile may then be extracted from the IIO in accordance with how the shape of the scanned image deviates from the fitted model. The random features which make up the forensic signature profile may then be extracted from the IIO image. However, a fully detailed model-based signature profile (MBSP) may not always be convenient in comparing two forensic signature profiles. Therefore, a technique may be applied to represent the MBSP in a more convenient manner.

In one such technique, the perimeter of the IIO, and thus the forensic signature profile, may be divided into a predetermined number of perimeter segments. For example, in a progressive barcode that includes an array of square elements of equal size, such as progressive barcode 30 (FIG. 2), the length of a perimeter segment may be selected to be equal to a side of an element.

The form of each segment of the forensic signature profile may be characterized and encoded (step 56). For example, a segment of the forensic signature profile may be characterized by a sum squared error (SSE), or variance (e.g. from an idealized perimeter or average value in a segment), of the forensic signature profile in that segment. The SSE for segment j may be calculated as:

$$SSE_j = \sum_{p_i \in segment(j)} (p_i - \mu_j)^2$$

where $p_i$ is a point of the forensic signature profile in segment j, and $\mu_j$ is the mean value of the forensic signature profile in segment j.

The SSE in a segment may be encoded as shape warp coding (SWC). For example, SWC may represent the forensic signature profile in segment j by a single integer:

$$SWC(j) = \left\| \frac{SSE_j}{SSE_{mean}} \right\|$$

where $SSE_{mean}$ represents a mean value of the SSE over all of the segments, and $\|\bullet\|$ represents a rounding function (e.g. to a nearest integer). The value of SWC(j) indicates an amount of variability of the forensic signature profile in the corresponding segment j.

For example, where the forensic signature profile has been divided into 40 segments, an SWC for a current signature profile $P_C$ may be expressed as a string of 40 integers, e.g.:

$P_C$={0300100100401010002001230124005002040120}.

Current signature profile $P_C$ may have been generated for an authorized printing of a document, or may have been generated for a received document whose authenticity needs to be verified. In other words, an extracted forensic signature profile may stand alone at this point, and serve as a forensic signature of the document, or may require comparison with a previously determined forensic signature (step 60) in order to verify the document.

If current signature profile $P_C$ has been generated for an IIO of a document that is known to be authorized, current signature profile $P_C$ may be made accessible via the IIO to serve as a forensic signature of the document (step 62). For example, current signature profile $P_C$ may be uploaded or stored at a location (e.g. file or network address) that has been encoded in the IIO.

Alternatively, current signature profile $P_C$ may be incorporated and encoded into the IIO. For example, current signature profile $P_C$ as shown above may be expressed in a binary form, e.g. as a binary string:
{0111001001001111010100011001111110111111001 1111001101111011 10}.

The binary string may be suitably processed (e.g. by padding, deleting, scrambling, encryption) so as to be suitable for encoding in the IIO. Appropriate payload indicia may then be added to the IIO so as to encode the processed binary string. For example, empty interior elements of the IIO may be filled in (e.g. where the signature profile is based on the perimeter of the IIO). Filling in interior elements of the IIO may require careful alignment with the IIO (e.g. within the color plane registration error). For example, a combination printer-scanner device may be programmed to align a printer with a scanned IIO, and may be provided with appropriate document guides to facilitate alignment.

Alternatively, current signature profile $P_C$ may be encoded into an IIO or other mark (e.g. a barcode) that is associated with (e.g. appended to, printed near, or at a known location relative to) the IIO. The associated mark that encodes the signature profile may be replaced with another at each stage of the workflow so as not to increase the area of the document that is occupied by the IIO and the associated mark.

Alternatively, a representation of the current signature profile $P_C$, or a scanned image of the document with its IIO, may be stored at an accessible location (e.g. as a file on a shared drive or at a network address). The accessible location may be encoded in the IIO of the printed document, or may be otherwise made available to a user. Alternatively, the forensic signature may be encoded in an IIO of a current electronic version of the document (whose location had been encoded in the IIO). Thus, if, at a future point of the workflow, the electronic version of the document is printed, the newly printed document will contain an IIO that encodes the forensic signature of the previously printed version of the IIO (which may be accessible as a stored image). Thus, at each point in the workflow, an IIO of the current electronic version of the document encodes a forensic signature of the current authentic printed version of the document. Similarly, at each point in the workflow, the IIO of the current authentic printed version encodes a forensic signature profile based on a scanned image of a previously printed version (if any previously printed version exists).

If current signature profile $P_C$ is to be compared with a previously calculated forensic signature that is accessible via the IIO, for example, if the document on which the IIO is printed requires authentication, the previous forensic signature may be retrieved via the IIO (step 63). For example, payload indicia of the IIO on the received document (or an appended IIO) may be scanned (e.g. at a resolution sufficient for resolving elements of the IIO) and interpreted to decode and retrieve a forensic signature that is encoded therein. Alternatively, the forensic signature may be retrieved from a file or location that is indicated by information encoded in the IIO. For example, an IIO of a current electronic version of the document may be retrieved and interpreted in order to retrieve a forensic signature of the current authentic printed version of the document for comparison and authentication.

The forensic signature may thus be interpreted to yield a retrieved signature profile $P_R$. Current signature profile $P_C$ may then be compared with the retrieved signature profile $P_R$ by calculating a difference between current signature profile $P_C$ and retrieved signature profile $P_R$ (step 64). For example, the difference may be expressed as a shape distortion encoding distance (SDED) between two forensic marks. The SDED between current signature profile $P_C$ and retrieved signature profile $P_R$ (each expressed as above as its SWC, is defined as:

$$SDED = \sum_j \min(|P_C(j) - P_R(j)|, T_{max}).$$

The (optional) threshold value $T_{max}$ may improve robustness (e.g. by preventing outlying values from dominating the calculated value of the SDED—when no threshold is required, $T_{max}$ may be set to an arbitrarily large value or infinity). As before, j is an index over segments of the perimeter for which the signature profile is calculated. SDED may be considered a modified Hamming distance between $P_C$ and $P_R$, where the expectation value of each SWC is 1 at each digit (due to normalization to the mean value).

Continuing the example above, $P_C$ and $P_R$ may be equal to:
$P_C$={03001001004010100020012301240050020401 20}
and
$P_R$={02101000005001100030011301150060020301 20}.
An difference between $P_C$ and $P_R$ may be expressed as {01100001001011000010001000110010000 10000}.

The resulting SDED is 12 (the sum of all of the digits in the distance), or 0.3 when normalized by the number of segments (40). The value of the calculated SDED may be used to determine whether or not $P_C$ and $P_R$ are likely to represent the same forensic signature profile. The larger the value of SDED, the greater the difference between $P_C$ and $P_R$. A small value of the SDED may thus indicate that $P_C$ and $P_R$ describe as single forensic signature profile, and may be interpreted to indicate that the document associated with $P_C$ is authentic. A large SDED (e.g. greater than a predetermined value, such as 1), may indicate that $P_C$ and $P_R$ represent different forensic signature profiles, and that the document associated with $P_C$ is not authentic or had been significantly damaged.

A method for obtaining forensic signature profiles in accordance with embodiments of the invention may be capable of authenticating documents that have been handled or exposed to the environment.

Figure 5:
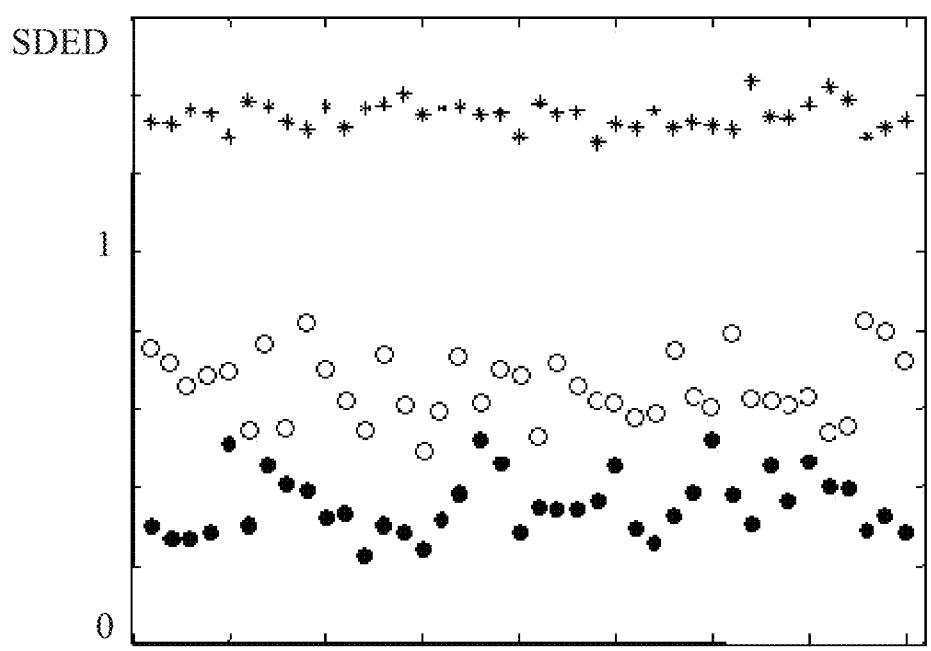
FIG. 5 shows a graph of true and false comparisons of forensic signatures in accordance with an embodiment of the invention.

FIG. 5 shows a graph of true and false comparisons of forensic signature profiles in accordance with an embodiment of the invention. The vertical axis represents values of the SDED when comparing different instances of two forensic signature profiles that were derived from scanning an IIO. In some cases, indicated by the solid circles, the two forensic signature profiles were derived from scanning the same printed IIO (known veridical match). The crosses represent pairs of forensic signature profiles that were derived from different printings of the IIO (known false match). The open circles represent cases in which a forensic signature profile derived from a freshly printed IIO is compared with a forensic signature profile that was derived from the same printed IIO after the IIO underwent an aging simulation process (veridical match with aging). (The aging process included exposure to ultraviolet radiation that was designed to be equivalent to 7 years of display in an office environment, and mechanical wear in the form of rubbing with a weight). As seen in FIG. 5, the SDED for the veridical match pairs with aging is generally greater than the SDED for the known veridical match pairs, but significantly less than for the known false matches. In this case, all of the known false matches yielded SDED values that were in the range of 1.2 to 1.5, while all of the veridical matches (with or without aging) yielded SDED values that were less than about 0.8.

A forensic marking IIO, in accordance with an embodiment of the invention, may be implemented in the form of software, hardware or a combination thereof.

Aspects of the invention may be embodied in the form of a system, a method or a computer program product. Similarly, aspects of the invention may be embodied as hardware, software or a combination of both. Aspects of the invention may be embodied as a computer program product saved on one or more non-transitory computer readable medium (or media) in the form of computer readable program code embodied thereon.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer, or on a plurality of computers.

Aspects of the invention are described hereinabove with reference to flowcharts and/or block diagrams depicting methods, systems and computer program products according to embodiments of the invention.

What is claimed is:

1. A non-transitory computer readable medium containing instructions that when executed cause a processor to execute the steps of:
    obtaining an image of an identifying object that is on a printed document;
    extracting a forensic signature from the image of the identifying object;
    enabling access to a representation of the extracted forensic signature via information encoded in the identifying object; and
    wherein extracting the forensic signature from the image is by identifying random components from an overall outline along variable external edges of an incremental identifying object (IIO).

2. The non-transitory computer readable medium of claim 1, wherein extracting the forensic signature comprises application of a model based signature extraction technique, wherein a model of an incremental identifying object (ITO) is constructed by analysis of previously printed and scanned samples of the IIO or from a priori knowledge of printed patterns.

3. The non-transitory computer readable medium of claim 1, wherein the forensic signature is represented by shape warp coding.

4. The non-transitory computer readable medium of claim 1, wherein enabling access comprises encoding a representation of the extracted forensic signature in an incremental identifying object, wherein the incremental identifying object is a progressive barcode.

5. The non-transitory computer readable medium of claim 1, wherein enabling access comprises storing the representation of the extracted forensic signature at a location that is encoded in the identifying object.

6. The non-transitory computer readable medium of claim 1, wherein the representation of the extracted forensic signature is encoded in an incremental identifying object of an electronic version of the document, the electronic version being accessible via information that is encoded in the identifying object.

7. The non-transitory computer readable medium of claim 1, wherein the extracted forensic signature is based on analysis of non-payload indicia of the identifying object.

8. A non-transitory computer readable medium containing instructions that when executed cause a processor to execute the steps of:
    obtaining an image of an identifying object that is on a printed document;
    extracting a forensic signature representation from the image of the identifying object;
    interpreting the identifying object to access a forensic signature for comparison with the extracted forensic signature representation; and
    wherein extracting the forensic signature representation from the image is by identifying random components from an overall outline along variable external edges of an incremental identifying object (IIO).

9. The non-transitory computer readable medium of claim 8, wherein extracting the forensic signature representation comprises application of a model based signature extraction technique.

10. The non-transitory computer readable medium of claim 8, wherein the extracted forensic signature representation is represented by shape warp coding.

11. The non-transitory computer readable medium of claim 8, wherein interpreting the identifying object comprises decoding an encoded forensic signature that is encoded in the identifying object.

12. The non-transitory computer readable medium of claim 8, wherein interpreting the identifying object so as to access the forensic signature comprises retrieving the forensic signature from a location that is encoded in the identifying object.

13. The non-transitory computer readable medium of claim 8, wherein the forensic signature is encoded in an identifying object of an electronic version of the document, the electronic version being accessible via information that is encoded in the identifying object.

14. The non-transitory computer readable medium of claim 8, further comprising instructions for comparing the extracted forensic signature representation with the forensic signature to verify authenticity of the document.

15. The non-transitory computer readable medium of claim 14, wherein comparing the extracted forensic signature representation with the forensic signature comprises calculating a shape distortion coding distance between the extracted forensic signature profile and the forensic signature.

16. The non-transitory computer readable medium of claim 8, wherein the extracted forensic signature representation is based on analysis of non-payload indicia of the identifying object.

17. A data processing system comprising:
    a processing unit in communication with a computer readable medium, wherein the computer readable medium contains a set of instructions wherein the processing unit is designed to carry out the set of instructions to:
        obtain an image of an identifying object that is on a printed document;

extract a forensic signature from the image of the identifying object; and enable access to a representation of the extracted forensic signature via information encoded in the identifying object; and wherein extracting a forensic signature from the image is by identifying random components from an overall outline along variable external edges of an incremental identifying object (IIO).

18. The system of claim 17, comprising a scanner for obtaining the image.

19. The system of claim 17, comprising a registry for storing the extracted forensic signature.

* * * * *

UNITED STATES PATENT AND TRADEMARK OFFICE
CERTIFICATE OF CORRECTION

PATENT NO.        : 8,798,328 B2                                  Page 1 of 1
APPLICATION NO.   : 13/087542
DATED             : August 5, 2014
INVENTOR(S)       : Steven J. Simske et al.

It is certified that error appears in the above-identified patent and that said Letters Patent is hereby corrected as shown below:

In the Claims

In column 9, line 54, in Claim 2, delete "(ITO)" and insert -- (IIO) --, therefor.

Signed and Sealed this
Twenty-fifth Day of November, 2014

Michelle K. Lee
*Deputy Director of the United States Patent and Trademark Office*